Figure 1:
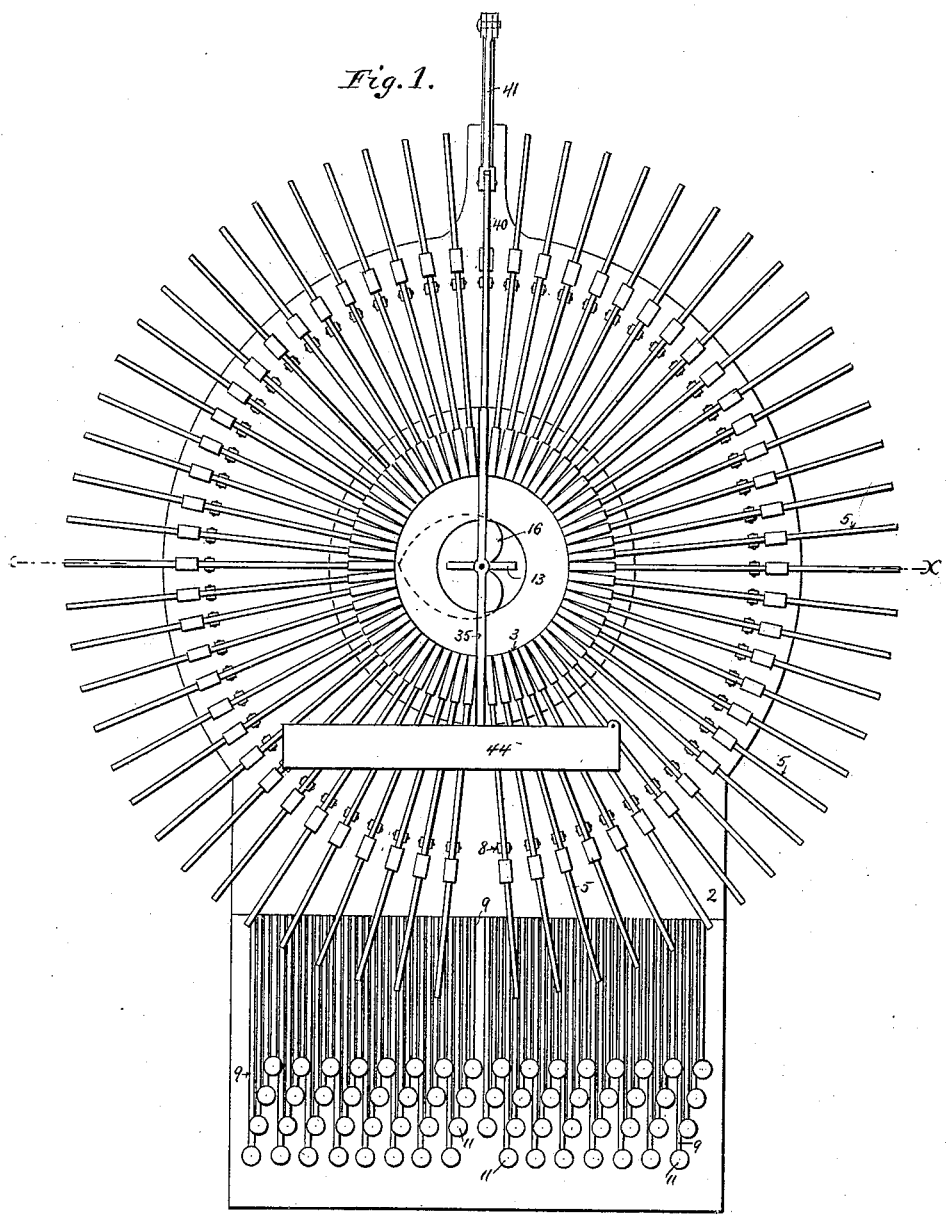

(No Model.)  6 Sheets—Sheet 1.

G. D. ROGERS.
TYPE SETTING AND DISTRIBUTING MACHINE.

No. 405,273.  Patented June 18, 1889.

Witnesses
A. M. Gaskell.
R. H. Sanford.

Inventor
George D. Rogers,
By A. C. Paul
Atty.

(No Model.) 6 Sheets—Sheet 2.
G. D. ROGERS.
TYPE SETTING AND DISTRIBUTING MACHINE.
No. 405,273. Patented June 18, 1889.
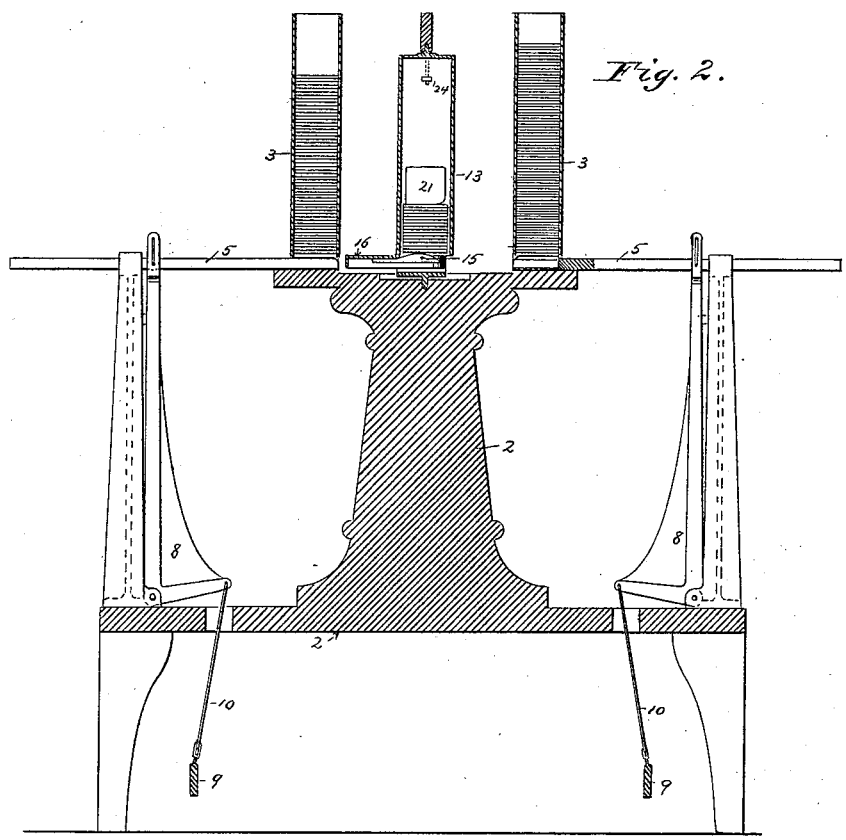
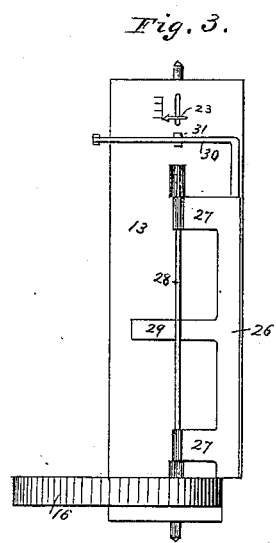
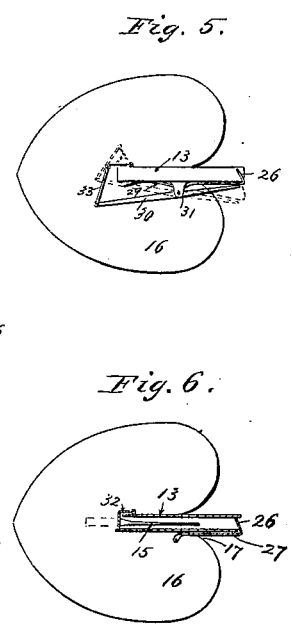
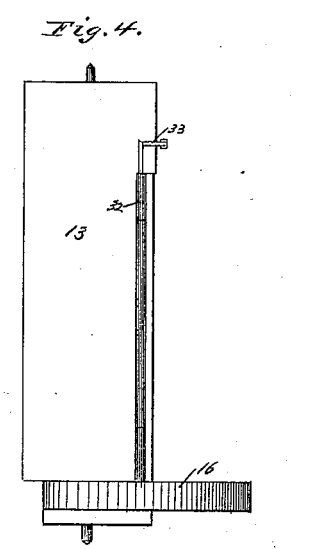
Witnesses
A. M. Gaskell
R. H. Lanford
Inventor
George D. Rogers
By A. P. Paul
atty (No Model.) 6 Sheets—Sheet 3.
G. D. ROGERS.
TYPE SETTING AND DISTRIBUTING MACHINE.
No. 405,273. Patented June 18, 1889.
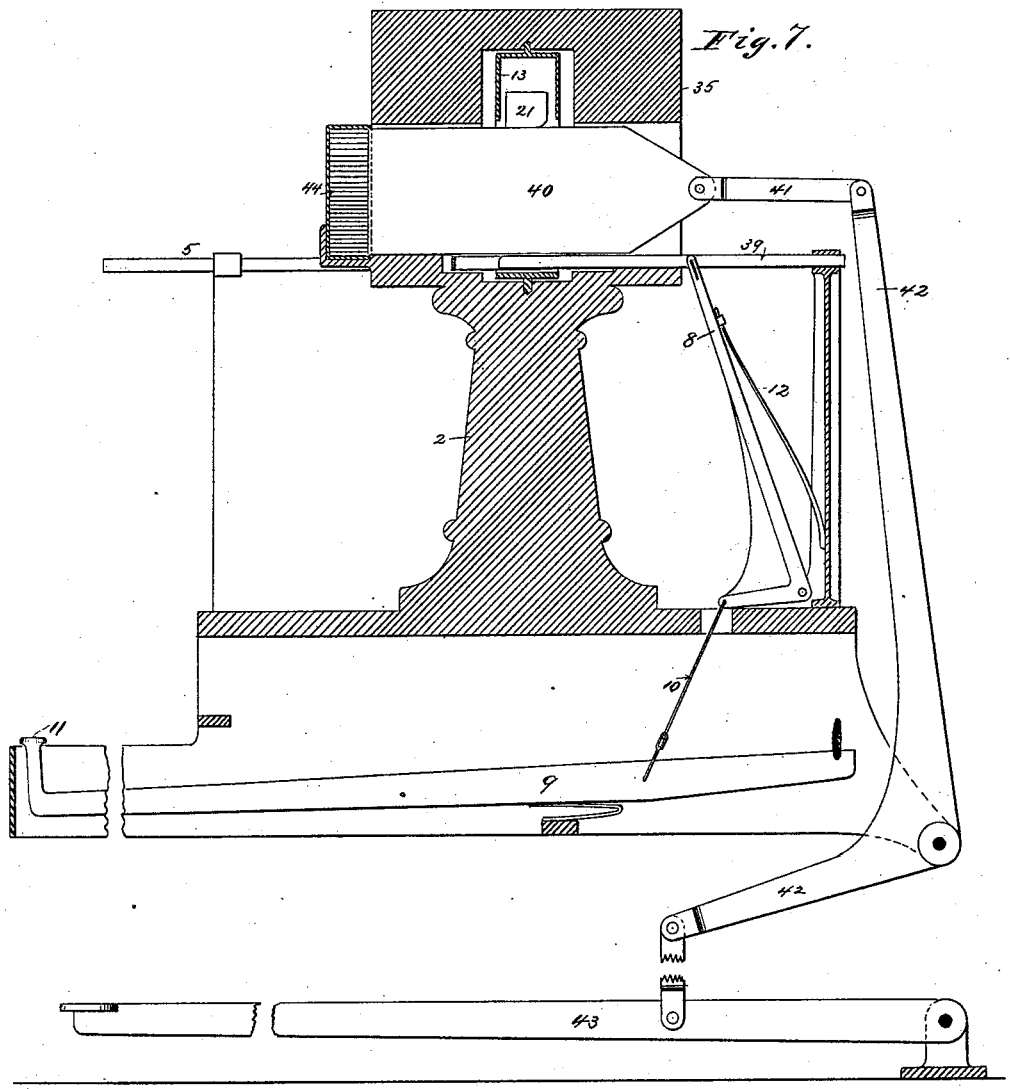
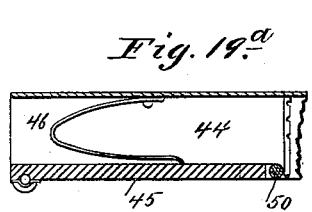
Witnesses
A. M. Gaskell
R. H. Sanford
Inventor
George D. Rogers.
By A. C. Paul
atty.

(No Model.)  6 Sheets—Sheet 4.
G. D. ROGERS.
TYPE SETTING AND DISTRIBUTING MACHINE.
No. 405,273.  Patented June 18, 1889.
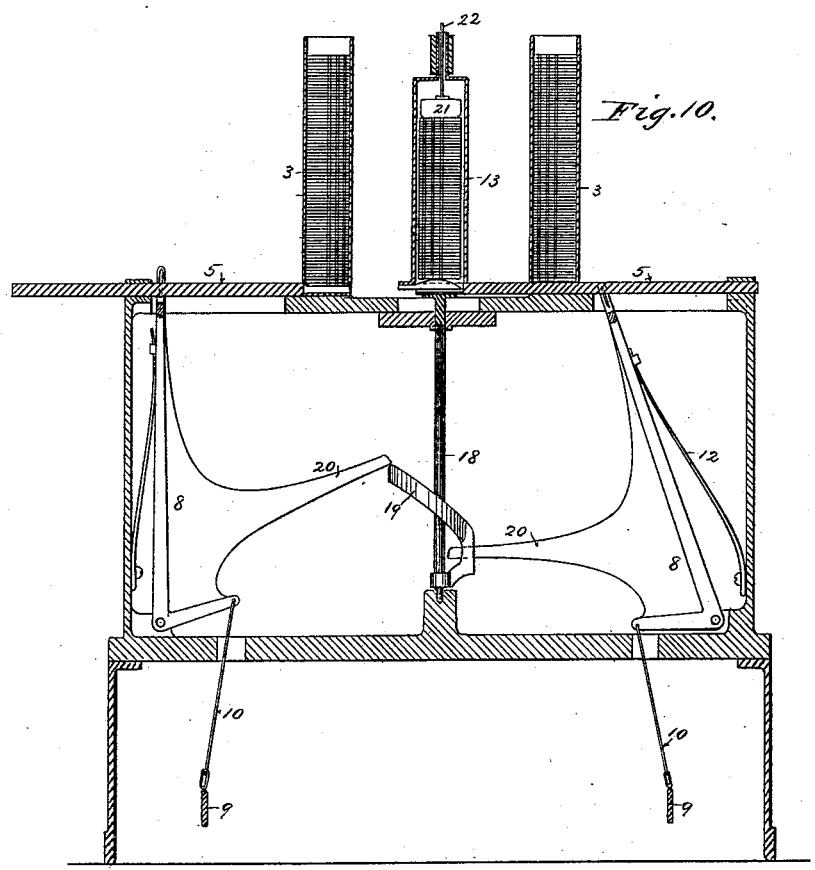
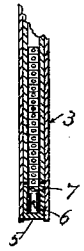
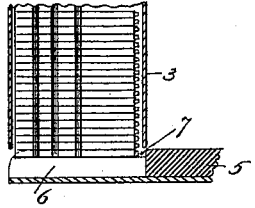
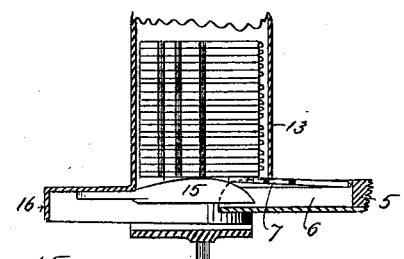
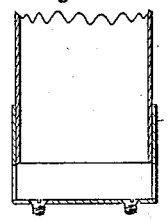
Witnesses
A. M. Gaskell
R. H. Sanford
Inventor
George D. Rogers,
By A. C. Paul
Atty.

(No Model.) 6 Sheets—Sheet 5.

G. D. ROGERS.
TYPE SETTING AND DISTRIBUTING MACHINE.

No. 405,273. Patented June 18, 1889.

Witnesses
A. M. Gaskell.
R. H. Sanford.

Inventor
George D. Rogers,
By A. C. Paine
att.

(No Model.) 6 Sheets—Sheet 6.

G. D. ROGERS.
TYPE SETTING AND DISTRIBUTING MACHINE.

No. 405,273. Patented June 18, 1889.

Witnesses.
S. J. Beardsley.
J. Jensen

Inventor.
George. D. Rogers.
By A. C. Paul atty.

UNITED STATES PATENT OFFICE.

GEORGE D. ROGERS, OF MINNEAPOLIS, MINNESOTA.

TYPE-SETTING AND DISTRIBUTING MACHINE.

SPECIFICATION forming part of Letters Patent No. 405,273, dated June 18, 1889.

Application filed September 6, 1886. Serial No. 212,817. (No model.)

*To all whom it may concern:*

Be it known that I, GEORGE D. ROGERS, of Minneapolis, in the county of Hennepin and State of Minnesota, have invented certain Improvements in Machines for Setting and Distributing Types, of which the following is a specification.

Heretofore many efforts have been made to produce a machine by which types can be rapidly and correctly set; but all such devices have either been complicated and expensive or they have failed to accomplish the desired result; hence types are still commonly set by hand in the old way.

The object of my invention is to provide a machine that is simple and inexpensive in construction by which types may be very rapidly and accurately set. To accomplish these objects, I construct a machine having a series of type-cases that are arranged in radial lines around a common center, and type-carriers that move radially and carry the types from the type-cases to a central receiving-case or composing-stick, in which they are deposited.

Other features of the invention will appear from the following detailed description.

The term "composing-stick" as used in the art designates a device in which the types are first placed and generally receives types enough to form a single line. I have used this term in the following specification to denote the receptacle or device in which the types are deposited by the carriers. It may contain a single type or enough to form a line or any other desired number or quantity.

The term "type-cases" I have used to denote the receptacles in which the different types are placed, and from which they are taken to be deposited in the stick, whatever the construction of these receptacles or devices may be.

The term "carrier" I have used to denote a device by which the types are carried or transferred from the type-cases to the composing-stick.

Figure 16:
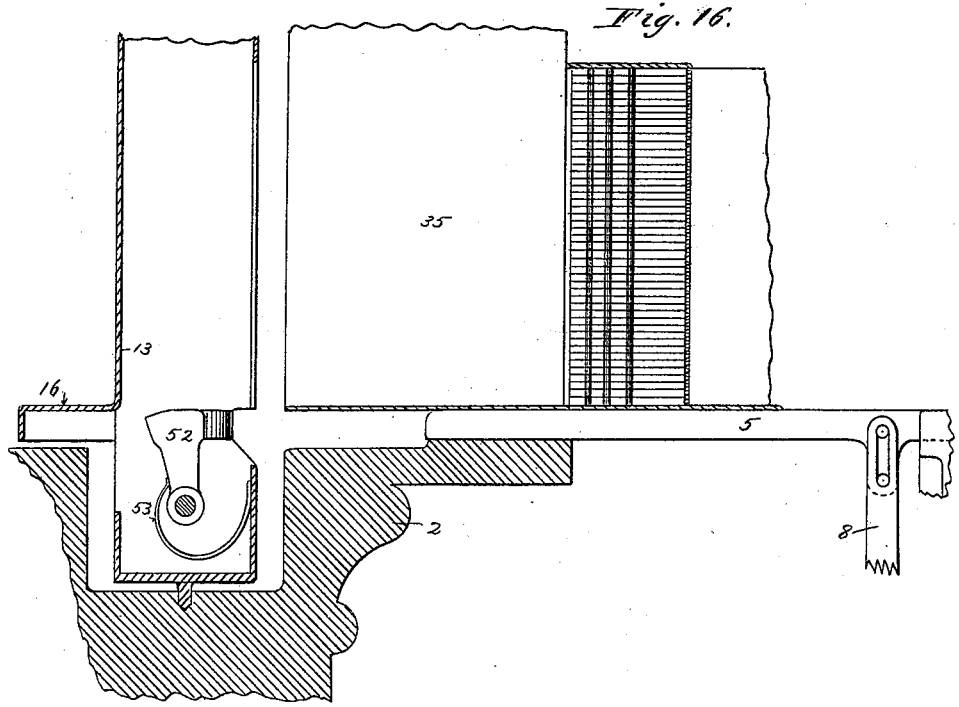
Figure 17:
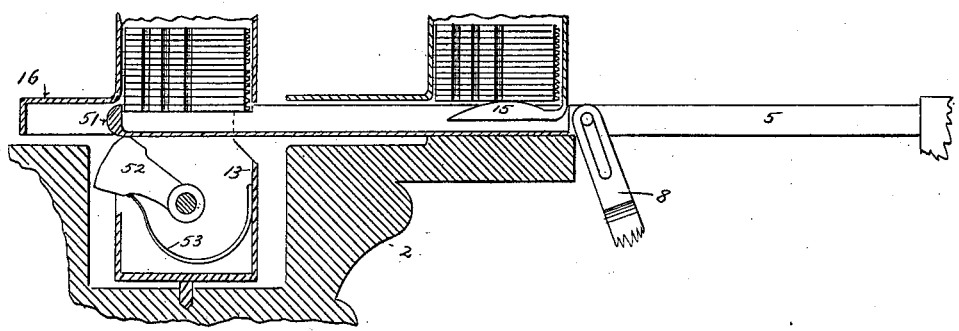
Figure 18:
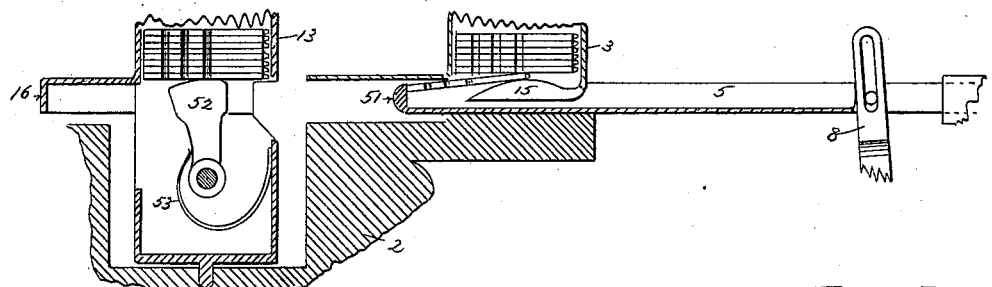
Figure 19:
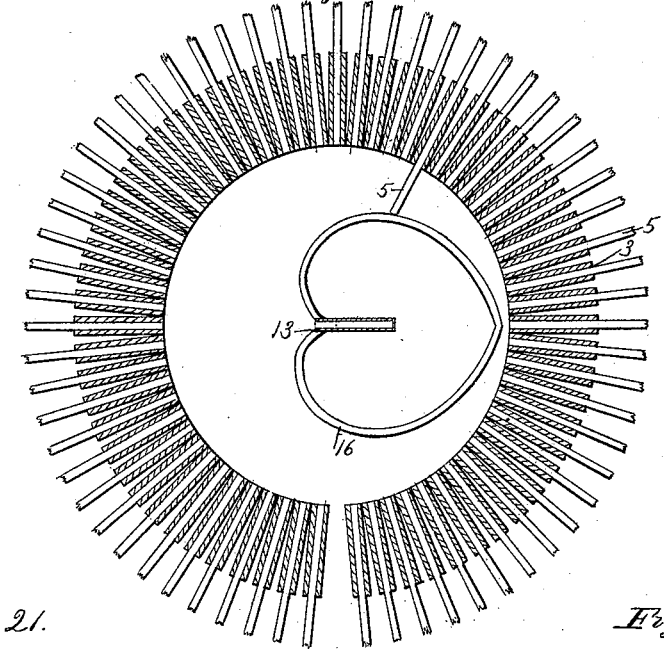
Figure 21:
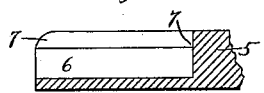
Figure 22:
Figure 20:
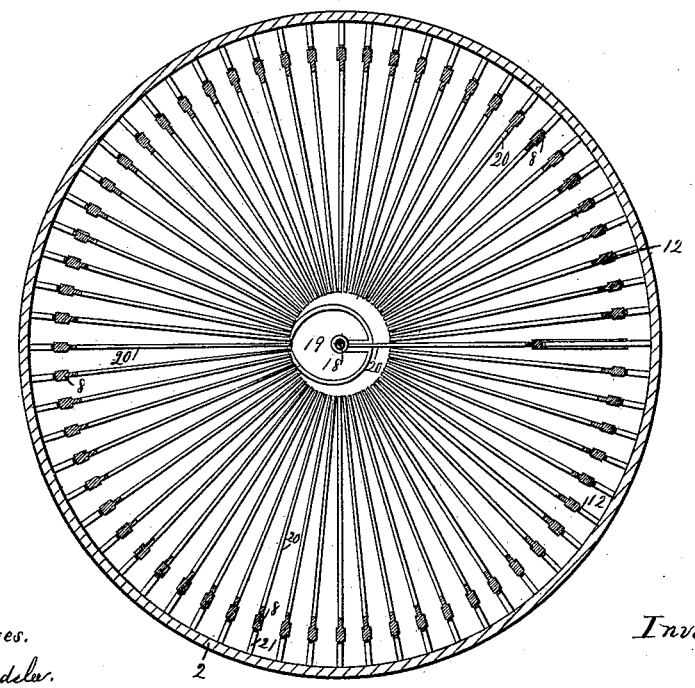

In the drawings which form a part of this specification, Figure 1 is a plan view of my improved type-setting machine. Fig. 2 is a cross-section on line *x x* of Fig. 1. Fig. 3 is an enlarged detail showing one side of the composing-stick. Fig. 4 is a similar view to Fig. 3, showing the opposite side of the composing-stick. Fig. 5 is a top view of the same. Fig. 6 is a cross-section showing the device for supporting the types in the stick. Fig. 7 is a longitudinal section showing the means for conveying the types from the composing-stick to the galley. Figs. 8 and 9 are details of the galley. Fig. 10 is a section showing a modification in the means for operating the composing-stick. Figs. 11 and 12 are details of the case. Fig. 13 is a section of the bottom part of the composing-stick in position for receiving a type. Figs. 14 and 15 are details of the type-cases. Fig. 16 shows a modification to adapt the machine for distributing type. Figs. 17 and 18 are details of this modification. Fig. 19 is a horizontal section through the type-cases, showing the carriers and the central stick with its operating-cam, one of the carriers being shown in the act of impinging on the cam. Fig. 19$^a$ is a detail of the door of the galley. Fig. 20 is a horizontal section of Fig. 10, taken on a line beneath the table 5'. Figs. 21 and 22 are details illustrating the construction of the forward end of the carriers.

In the drawings, 2 represents the main frame of the machine. It may be of any suitable construction, and may support all of the working parts of the machine.

3 represents type-cases in which the type are held, and from which they are taken by the type-carriers and conveyed to the composing-stick. The type-cases are arranged on radial lines around a common center, as shown in Fig. 1. They are open at the bottom, and the types pass from them to the carriers, as hereinafter described. The cases are preferably of substantially the length and width of the type and of any convenient height. The types are placed in the cases, one on the top of another, as shown in Figs. 2, 11, and 12, the different characters being placed in separate cases.

A type-carrier 5 is provided for each type-case. These carriers consist of sliding bars that move toward a common center beneath the type-cases. Each bar has a groove 6 in its forward end. A shoulder 7 is formed in each wall of the groove near its top. The width of the groove above these shoulders is sufficient to receive a type, and the shoulders are far enough below the top of the groove for a type resting on them to be wholly contained within the groove, as shown in Figs. 11 and 12. The carriers are supported in suitable ways on the frame of the machine, and when in their normal position their grooved portions are beneath the type-cases, and the lower type in each case rests upon the shoulders 7 in the groove 6. The carriers are arranged on the same radial lines as the cases, and all move toward the same central point.

The means for moving the carriers is preferably as follows: A pivoted bell-crank lever 8 has one arm connected to each carrier, its other arm being connected by a rod 10 with a lever 9, having upon its end a key 11, which should be marked to indicate the character that is contained in the case with which the carrier is connected. A spring 12 tends to hold each carrier in its retracted or normal position.

A receiving or composing frame or stick 13 is pivoted on the frame of the machine, its axis being coincident with the point toward which all the carriers move. This stick is free to turn upon its axis in either direction. The composing-stick 13 is provided at its lower end with an aperture that is adapted to receive the end of any one of the carriers. The stick is also provided with a narrow tongue or type-support 15, that has a curved upper surface and a sharp point, the point being arranged in the line of the opening through the wall of the stick. This tongue 15 is located in such position relatively to the opening that as the carrier is projected into the frame it enters the groove 6 below the type, the end of the type rides up over the curved surface of the tongue, and the type is raised out of the groove 6 and is deposited in the stick on top of this tongue. The next type is forced between the tongue and the type resting on it, and so on until the stick is filled. (See Fig. 13.) The carrier, being retracted by the spring, moves back to its normal position, and the next type in the case falls into its groove, ready to be moved to the composing-stick when required.

It is necessary that the types be placed in the composing-stick in line with one another, and with their faces all in the same direction. The types must therefore all enter the stick in the same direction. To secure this result the composing-stick is provided with means that cause it to turn and present its opening to any carrier that is moved toward it. I have shown in the drawings two substantially equivalent devices for this purpose.

In Figs. 1, 2, 3, 4, 5, and 6 the composing-stick is provided with a horizontal heart-shaped cam 16, that is in the plane of the carriers, and whose re-entrant angle 17 is coincident with the opening in the wall of the composing-stick.

When any carrier that is not directly in line with the opening in the composing-stick is projected toward the stick, its end encounters the edge of the cam, and as the carrier is pressed forward it turns the cam and the composing-stick on their axis until the end of the carrier comes opposite the opening of the stick. It enters this opening and deposits its type in the stick in the manner already described.

In Fig. 10 I have shown the composing-stick provided with a spindle 18, that extends below the plane of the carriers. An inclined cam 19 (a plan view of which is of substantially heart shape) is mounted on this spindle. Each of the bell-crank levers 8 in this modification is provided with an arm 20, that extends above the top of the cam 19. When any one of the keys is pressed, the arm 20 on the lever connected with that key bears on the cam, and causes the cam, and with it the composing-stick, to turn until the arm 20 enters a vertical recess at the bottom of the cam. The spindle and stick are thereby locked with the opening in the composing-stick in line with the carrier that is moved by that key. When the key is released, the spring retracts the lever and the carrier, as in the other construction. Any other equivalent means may be employed to cause the composing-stick to turn on its axis to receive the carrier. Other contrivances for this purpose will doubtless suggest themselves to any skilled mechanic. I do not, therefore, confine myself to the described details of construction or arrangement of this device.

A follower 21 may be arranged in the composing-stick to rest on the types and prevent their tipping forward on the curved surface of the tongue 15. This follower may be merely a block of metal having one corner rounded off, as shown in Fig. 2, so as to permit the types to enter the stick freely, or it may have a guide pin or spindle 22, that extends through a hollow pivot at the top of the stick.

I prefer to construct the composing-stick of sufficient height to receive enough type to form a line in the column, and in order to show when enough type have been put into the stick for this purpose I prefer to provide the stick with a suitable indicator. This indicator may be made by forming a series of marks on the stem 22. As the follower 21 rises, the marks on the stem indicate the position of the types in the stick, and also the number of units of space that remain to be filled. The indicator may be formed by a series of marks on the outside of the stick and a pointer 23, that is secured to a stem 24, that projects into the interior of the stick. When the follower reaches the stem 24, it raises the pointer and moves it over the marks on the stick. The position of the pointer shows the number of units-spaces yet to be filled to complete a line of type. I also provide means for transferring the types from the composing-stick to the galley. The means that I prefer to use for this purpose is as follows: The stick is provided at its forward edge (that is, the edge having the aperture through which the types are inserted) with a door 26, that is hinged to the outside of the side wall of the stick at substantially its middle portion. The hinge may be formed by plates 27, that extend back from the edge of the door, and a wire 28, that forms the pintle of the hinge. The door 26 has an inclined front. A spring 29 bears against the door and holds it normally closed. A lever 30 is secured to the door near its front, and is pivoted upon a lug 31 on the side of the stick. This lever extends to the rear of the stick, and is connected by a link 33 with a door 32, hinged to the rear of the stick and forming the rear wall thereof. (See Figs. 3, 4, 5, and 6.) A vertical frame 35 extends over the stick 13, and the bearing for the upper pivot of the stick may be formed in this frame, as shown in Fig. 7. The frame 35 has an opening extending longitudinally through it. A sliding bar 39 is arranged in line with the frame 35. It is mounted in bearings or ways on the table or frame of the machine, and is connected to one of the levers 8 in a manner similar to the type-carriers 5. A plunger or pusher 40 is arranged in one side of the frame 35. This plunger is connected by a link 41 with a bell-crank lever 42, that is connected with a foot-treadle or suitable lever 43. The type-galley 44 is supported on the frame of the machine opposite the frame 35. The galley has a hinged door 45, that is held normally outward in the plane of the front of the galley by a spring 46. The door may be pushed back into the galley against the tension of the spring 46, as indicated by dotted lines in Fig. 9. The edge of the door is opposite the opening in the frame 35, as shown in Fig. 9.

The operation of the transferring device is as follows: The key that is connected with the sliding bar 39 is operated. The bar slides into the opening in the cam and locks the stick so that it stands in the same vertical plane with the frame 35. The plunger 40 is then moved forward through the opening in one side of the frame 35. The end of the plunger encounters the inclined door 26 and turns it on its hinges against the tension of the spring 27. As the door 26 opens, the door 32 is opened by the lever 30. As the plunger continues to advance, the types are pushed out of the stick through the frame 35 and into the galley. As the types pass out of the frame 35, they strike the door 45 close to its edge and force it back into the galley. As the types advance in a straight line, they pass the edge of the door. The tension of the spring 46 tends to close the door, and does so as soon as the types are entirely within the galley. As the door closes, it crowds the types along in the galley, making room for the next line. The plunger is released and withdrawn, the doors of the stick are closed by the spring 29, the locking-bar 39 is released and withdrawn, and the machine is ready to have another line of type set in its stick.

In some instances I prefer to provide the door of the galley with a roll 50 in its edge, in order to lessen the friction between the door and the types, so that the pressure of the spring 46 will more easily move the types along in the galley. (See Fig. 19ª.)

In some instances I prefer to form the type-cases 3 in two sections, as shown in Figs. 14 and 15, the lower section being adapted to be secured to the frame of the machine by screws or other suitable means. The other section of the case sets into this section, and may be removed or inserted at pleasure. I also prefer to provide the machine with means that will adapt it for use as a distributing-machine. For this purpose the type-cases 3 are provided with the curved tongues 15, which project into the grooves 6 in the type-carriers 5. The type-carriers are provided at their ends with lugs 51. The pivoted stick has a cam 52 pivoted below the aperture in its wall, which is held in a vertical position by the spring 53. A line of type is placed in the stick 13. The operator, being supplied with a proof of the line, operates the keys in the proper order to transfer the types to their respective cases. A type-carrier, being projected into the stick, receives the lower type into the groove in its end. This type is transferred to the type-case and deposited therein, and so on until all of the types are distributed.

The operation of the machine will be readily understood from the foregoing detailed description.

The main feature of the invention is in the centrally-located receptacle with the radially-arranged type-cases and the type-carriers that move to the center in which the type-receiving receptacle is located.

The details of construction of the secondary features of the invention may be varied without departing from my invention.

What I claim as my invention, and desire to secure by Letters Patent, is—

1. In a type-setting machine, the combination of a series of type-cases arranged in radial lines around a central point, a series of type-carriers moving in radial lines from said type-cases to said central point, and a type-receiver located at said central point, substantially as described.

2. In a type-setting machine, the combination of a series of type-cases, a series of radially-moving type-carriers, and a pivoted composing-stick having a type-receiving aperture and adapted to be turned in either direction upon its pivots to present said aperture to any one of said carriers, substantially as described.

3. The combination, in a type-setting machine, of the pivoted stick 13, having a type-receiving aperture, a series of type-cases arranged in radial lines around said stick, a series of radially-moving type-carriers, and a cam on the spindle of said stick adapted to be engaged by a moving part of the carrier and turn said spindle on its axis, all substantially as described.

4. The combination, with the sliding carrier 5, having the groove 6 and shoulders 7, of the stick 13, having an aperture adapted to receive the carrier, and the curved tongue 15, arranged opposite the aperture in said stick, substantially as described.

5. In a type-setting machine, the type-carrier 5, having a groove 6 in its end, and shoulders 7 in the walls of the groove at a point below its top, as and for the purpose set forth.

6. In a type-setting machine, a vertical pivoted composing-stick having a type-receiving aperture in its end wall, substantially as and for the purpose set forth.

7. The combination, in a type-setting machine, with the stick 13, frame 35, and pusher 40, of the galley 44, having the hinged door 45, and the spring 46, all substantially as described.

8. In a type-setting machine, the galley having the inwardly-opening door 45, and the spring 46, adapted to hold said door in a closed position, but permitting it to yield inwardly upon the application of pressure against its front, substantially as described.

9. In a type-setting machine, the pivoted stick 13, having hinged doors at its front and rear, and means, substantially as described, connecting said doors, whereby both doors are opened and closed simultaneously, substantially as described.

10. In a type-setting machine, the pivoted composing-stick 13, having the inclined front door 26, the rear door 32, the spring 29, pivoted lever 30, and link 33, all substantially as described.

11. In a type-distributing machine, the combination of a central pivoted type-case, a series of type-receivers arranged in radial lines around said central type-case, and a series of type-carriers moving in radial lines from said central type-case to the type-receivers, all substantially as described.

GEORGE D. ROGERS.

Witnesses:
A. C. PAUL,
A. M. GASKELL.